United States Patent [19]

Sakaida et al.

[11] Patent Number: 4,970,506

[45] Date of Patent: Nov. 13, 1990

[54] METHOD AND APPARATUS FOR CONTROLLING THE START OF DATA TRANSMISSION

[76] Inventors: Yousuke Sakaida; Harutomo Narita, both of c/o Oki Electric Industry Co., Ltd., 7-12, Toranomon 1-chome, Minato-ku, Tokyo, Japan

[21] Appl. No.: 298,204

[22] Filed: Jan. 17, 1989

Related U.S. Application Data

[63] Continuation of Ser. No. 25,991, Mar. 16, 1987, abandoned.

[30] Foreign Application Priority Data

Mar. 20, 1986 [JP] Japan .................................. 61-60816

[51] Int. Cl.$^5$ .............................................. H04Q 9/00
[52] U.S. Cl. ...................... 340/825.140; 340/825.200; 370/29; 370/109
[58] Field of Search ...................... 340/825.06, 825.14, 340/825.2; 370/29, 32.1, 31, 100, 100.1, 109; 379/93; 455/343; 375/11, 13, 8

[56] References Cited

U.S. PATENT DOCUMENTS

| | | | |
|---|---|---|---|
| 3,967,058 | 6/1976 | Moriya et al. | 370/29 |
| 4,404,672 | 9/1983 | Shimizu | 370/29 |
| 4,432,089 | 2/1984 | Wurzburg et al. | 370/29 |
| 4,467,473 | 8/1984 | Arnon et al. | 370/100 |
| 4,484,028 | 11/1984 | Kelley et al. | 370/29 |
| 4,514,840 | 4/1985 | Bader et al. | 370/100 |
| 4,592,051 | 5/1986 | Frizlen | 370/100 |
| 4,637,016 | 1/1987 | Ciancibello et al. | 370/29 |
| 4,754,273 | 6/1988 | Okada et al. | 340/825.2 |
| 4,792,940 | 12/1988 | Hiraguchi | 370/32.1 |

OTHER PUBLICATIONS

Andry et al., "A Long Burst Time-Shared Digital Transmission System for Subscriber Loops", NTG--Fachber (Germany), vol. 73, (1980).

Shimizu et al., "An Integrated Voice/Data Terminal with Simple Synchronization Circuits Using an 80 Kbit/s Ping-Pong Method", IEEE Transactions on Communications, vol. COM-30, No. 9, Sep. 1982, pp. 2109-2116.

H. R. Brown and G. C. Mason; "Services for the Emerging ISDN", ICC Jun. '81, Colorado.

J. H. M. Hardy and C. E. Hoppitt: "Access to the British Telecom ISDN", ICCC Sep. '82.

Jan Meyer, Terje Roste, and Ronald Torbergsen; "A Digital Subscriber Set", IEEE TC, vol. COM-27, No. 7, Jul. 1979.

*Primary Examiner*—Donald J. Yusko
*Assistant Examiner*—Edwin C. Holloway, III

[57] ABSTRACT

In a method of controlling the start of data communication between two LSIs (master and slave) effecting a ping-pong transmission and the configuration of those LSIs, both the master and slave LSIs receive and detect a start instruction signal before starting the data transmission. The master LSI transmits an answer signal upon receiving a start instruction signal from the slave LSI, and starts, after a prescribed period of time, the ping-pong transmission to the slave SLI. In addition, when the master LSI itself transmits a start instruction signal to the slave LSI, it serves to start the ping-pong transmission to the slave LSI after receiving the answer signal from the slave LSI. The slave LSI transmits back, upon receiving the start instruction signal from the master LSI, an answer signal to start the ping-pong transmission. Furthermore, the slave LSI can also transmit by itself a start instruction signal to the master LSI, and thereupon starts the ping-pong transmission after receiving the answer signal from the master LSI.

3 Claims, 7 Drawing Sheets

METHOD AND APPARATUS FOR CONTROLLING THE START OF DATA TRANSMISSION

This application is a continuation, of now abandoned application Ser. No. 07/025,991, filed March 16, 1987, now abandoned.

BACKGROUND OF THE INVENTION

1. Field of the Invention

The present invention relates to a data transmission system in a two-wire subscriber's line using a metallic cable, and more particularly to a start control system for transmission control of LSIs provided in a subscriber side terminal apparatus and in an exchange side apparatus to which apparatuses a time sharing compression transmission system called "a ping-pong transmission system" is applied.

2. Description of the Prior Art

Conventionally, a time sharing compression transmission system, called a "ping-pong transmission system", was employed for two-way digital transmission between two apparatuses using a two-wire subscriber's line composed of a metallic cable such as the existing telephone line.

This system is adapted to share a transmission path in a time sharing manner, and transmit a digital data burst signal only in a single direction, upwardly or downwardly, and thereafter to alternately repeat such a transmission for two-way transmission of the digital data signal.

The following references, for example, describe the principles of prior art ping-pong transmission systems: (1) H. R. Brown and G. C. Mason; "Services for the Emerging ISDN", ICC '81, Colo. (2) J. H. M. Hardy and C. E. Hoppitt; "Access to the British Telecom ISDN", ICCC '82 (3) Jan Meyer, Terje Roste, and Roald Torbergsen "A Digital Subscriber Set" IEEE TC, Vol COM-27, No. 7 July 1979.

Figure 1:
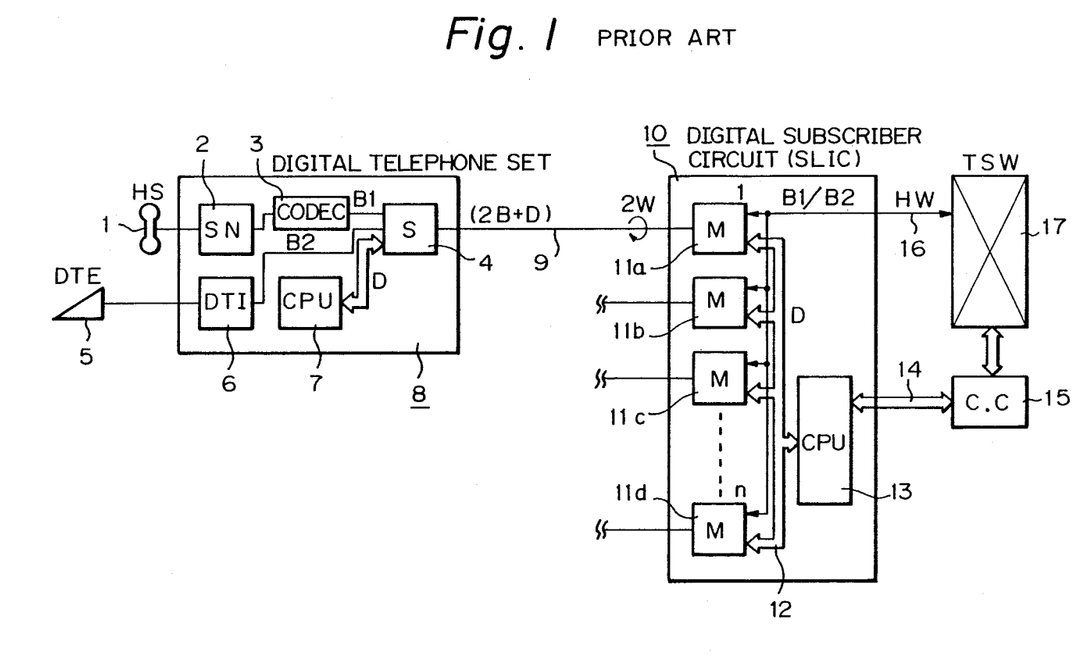
FIG. 1 is a view illustrating a subscriber's line of a digital exchange using a prior art ping-pong transmission system.

An exemplary arrangement, to which such a prior ping-pong transmission system is applied, will here be described with reference to FIG. 1. FIG. 1 is a block diagram illustrating digital data communicatin between a subscriber side digital telephone set 8 and an exchange side digital subscriber circuit 10 connected via a metallic two-wire telephone line 9.

As shown in FIG. 1, the subscriber side includes a handset (HS) 1 for ordinary telephone call;

a speech network (SN) 2 for two-way transmission of an analog speech signal;

a CODEC (coder and decoder) 3 for bidirectionally converting between an analog speech signal and a digital signal;

a slave LSI (i.e.-line subscriber interface) (S) 4 for controlling the pin-pong tansmission, a data terminal (DTE) 5 for transmitting/receiving digital data;

a data terminal interface (DTI) 6 to match the data terminal 5 and the slave LSI 4 to each other, and a central processing unit (CPU) 7 for controlling the operations of respective components of the digital telephone set 8.

While, the exchange side includes, although neglected in part, a time sharing exchange switch (TSW) 17, a central control unit (CC) (i.e.-subscriber line interface circuit) 15, and a digital subscriber circuit (SLIC) 10. The digital subscriber circuit 10 has n master LSIs (M) 11a... 11d for controlling the ping-pong transmission, which are controlled by a CPU 13 via a control bus 12. Moreover, in the same figure, designated at 14 is a control bus for permitting the station side central control unit (CC) 15 to control the digital subscriber circuit 10, and 16 is a highway (HW) through which an exchange signal to be transmitted passes.

In succession, transmission codes and a ping-pong period of the ping-pong transmission system, and operation and a start system of a prior art ping-pong transmission LSI will be described.

Figure 2:
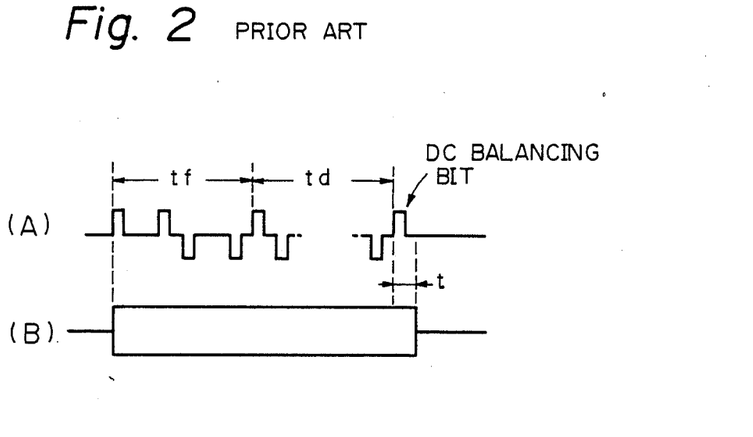
FIGS. 2(a)-2(B) are views illustrating the waveforms of the AMI code for use in the ping-pong transmission.

There are a wide variety of transmission codes for use in the ping-pong transmission system. Here an AMI code is assumed and further assumed is a ping-pong transmission system of 144 kb/s comprising speech data (8 bits) B1, data (8 bits for data terminal, etc.) B2, and control (2 bits) D. In addition, the AMI code typically includes a frame inserted thereinto in need of mutual synchronization independently of transmission data. FIGS. 2(A)–(B) exemplarily illustrate the arrangement of the AMI code, wherein tf is a frame interval; td is a data interval (8 bits+8 bits+2 bits)(B+B+D), and t is a transmission bit period of the AMI code. A DC balancing bit is inserted into the rear portion of the AMI code depending on the data arrangement. FIG. 2 (A) illustrates the arrangement of this AMI code, which will hereafter be indicated by a symbol of FIG. 2 (B) as one burst.

Figure 3:
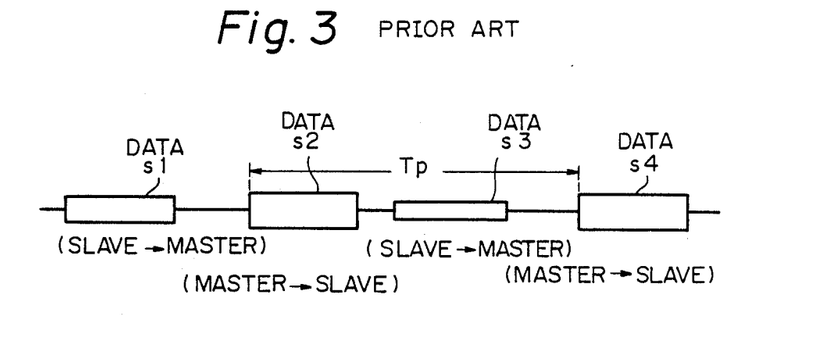
FIG. 3 is a view illustrating a signal in the ping-pong transmission.

FIG. 3 illustrates a signal arrangement during the ping-pong transmission, wherein S1 and S3 indicate data from the slave LSI to the master LSI, and S2 and S4 indicates data from the master LSI to the slave LSI. A time interval Tp between the data S2 and S4 is the ping-pong period.

The ping-pong transmission is divided broadly into two main apparatuses: one taking the initiative in transmission timing and the other following after the former. The apparatus taking the initiative here is the master LSI on the exchange side while the follow-up apparatus is the slave LSI on the side of the digital telephone set. For the exchange, digital exchanges take the lead at present, which are adapted, from the viewpoint of processing speech data, to undergo time-sharing switching in, synchronism with the Nyquist frequency of 8KHz. On the other hand, the digital telephone set is to only receive data from the exchange and transmit transmission data on this side to the partner. Accordingly a ping-pong transmission in synchronism with 8 KHz on the exchange side is effected.

Hereupon, the above description assumed the LSIs effecting the ping-pong transmission to be the master LSI on the exchange side while the slave LSI on the side of the digital telephone set, and they will hereinafter be referred to as a MLSI and a SLSI, respectively. But, the actual MSLI and SLSI may have the same architecture and hence be switchable from the outside to be a master or a slave.

In succession, operations of these MLSI and SLSI will be described. The MLSI takes, as described previously, the initiative in transmission timing so that the MLSI first transmits data to the SLSI and then waits for any data from the SLSI. This state of the MLSI of waiting for data from the SLSI here means a state thereof of not transmitting the AMI burst and also being capable of receiving data from the other side. The MLSI further, after effecting the above ping-pong operation for a prescribed time interval, again performs the operation just described above and repeats these operations thereafter. The SLSI maintains a state of waiting for receiving data from the MLSI, and transmits data to the MLSI immediately after completing the data reception. Thereafter, the SLSI again maintains the waiting state for data reception.

Figure 4:
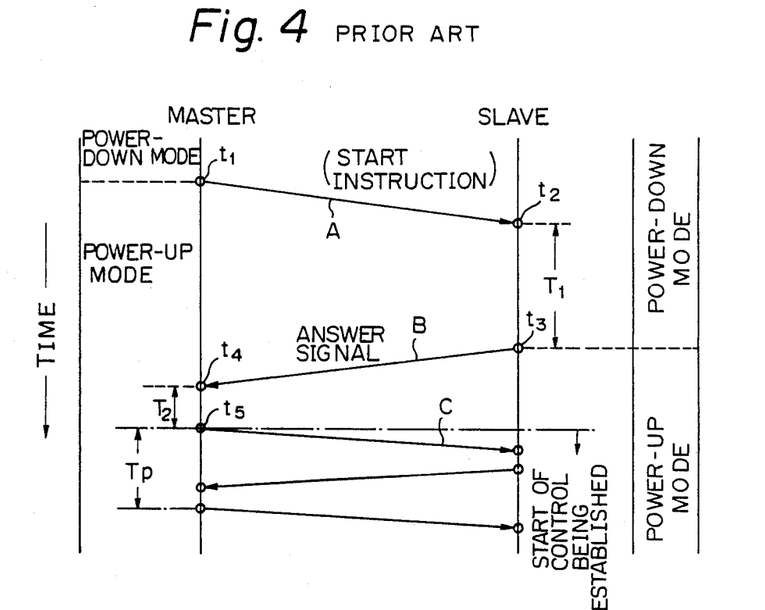
FIG. 4 is a view illustrating a start control sequence of prior art master and slave LSIs after establishing communication.

The sequences of both prior art LSIs for controlling the start of data transmission after establishing communication will be described with reference to FIG. 4. As shown in the same figure, the vertical direction represents a flow of time passing downwardly with time points t1 to t5 of transmitting and receiving respective signals. Moreover, a power-down mode means one not transmitting data while a power-up mode means one transmitting data. The power down mode is here a mode provided for reducing power consumption upon non-data transmission in a state of the system connected to the transmission line.

Figure 5:
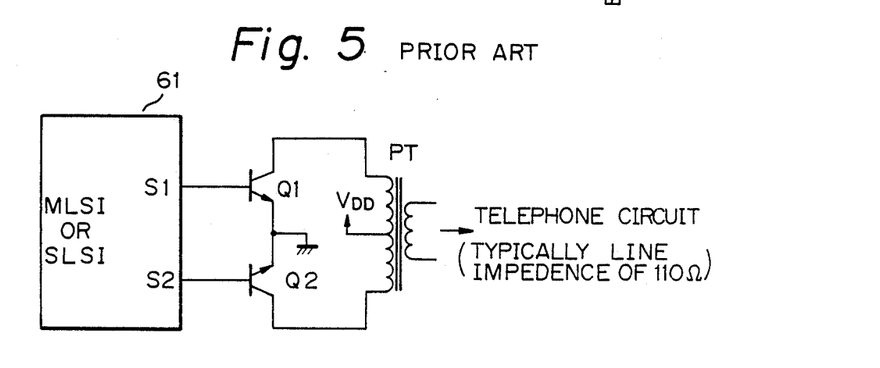
FIG. 5 is a block diagram showing a drive circuit for generating the AMI code.

Describing this in further detail, the digital telephone set, etc., including the SLSI contained therein are often powered from the exchange side, and hence power consumption to be applied to of the SLSI is limited. The line impedance of a telephone circuit is typically 110 Ω, and many methods to transmit the AMI code are arranged as illustrated in FIG. 5. In the same figure, designated at 61 is the MLSI or SLSI, Q1 and Q2 are respectively NPN transistors, PT is a pulse transformer, S1 and S2 are respectively output terminals of the LSI to drive the transistors Q1 and Q2, and VDD is a power source. Power consumption in the LSI is typically much lower than the power to drive the pulse transformer, and hence it is rather advantageous for reducing the power consumption to have no output from S1 and S2 when the ping-pong transmission is not performed. This mode is the power-down mode illustrated in FIG. 4, which controls the outputs from S1 and S2 to stop them from the outside of the LSI. Against this, the power-up mode is one enabling S1 and S2 to output any signal, under which mode the MLSI and SLSI are usually employed.

Here, the MLSI and SLSI are under the power-down mode before starting the control of data transmission. When a start switch (not shown) in the MLSI is turned on, the MLSI is switched to the power-up mode, and transmits a start instruction signal A to the SLSI (t1). This signal A is not specific but is a burst signal according to the AMI code shown in FIG. 2. The SLSI is judged to receive the start signal by permitting a 8 KHz frame signal (involved in tf of FIG. 2) to be extracted from the signal A. The SLSI further, upon receiving this signal A, counts the frame signal and informs the outside of the reception of the start instruction signal when the count reaches a prescribed value. 2 bits for control in the AMI code are employed as a means for such an informing operation, the informing operation being executed by transmitting a command to an external CPU, etc. The CPU etc., so receiving the command, release the SLSI from the power-down mode externally and switches it to the power-up mode. The SLSI in the power-up mode transmits an answer signal B to the MLSI in the reception waiting state, in synchronism with the transmission timing (8KHz) of the MLSI (t3). The answer signal B is a burst signal according to the AMI code shown in FIG. 2 similar to that of the start instruction signal A. A time interval T1 in the same figure is a time difference (t3-t2) of processing from the time the SLSI informs the outside of reception of the start instruction to the time the external CPU etc. release to the SLSI from the power-down mode. The MLSI, upon receiving the answer signal (t4), counts the frame signal in the same manner as the SLSI, and judges, after (t5) a prescribed time interval (t2), that the start of the control is established, and transmits data C, and thereafter performs the known ping-pong operation.

Conventionally, it was possible as described above, to start the control by issuing a start instruction signal from the master to the slave. This is due to the above described prior art system simply effecting one-way (master→slave) ping-pong start control. There is however, a need for effecting such a start control oppositely, i.e. from the slave to the master.

In fact, these master and slave LSI's are simply different in that one transmits the AMI code to the partner in synchronism with an external synchronizing signal (8 KHz in the present case) or the other transmits the AMI code to the partner in synchronism with the AMI code transmitted. The former is the master and the latter the slave, which latter slave can functionally transmit such a start instruction signal as in the master. However, the master, if receiving the start instruction signal, is restricted in its transmission timing by a synchronizing signal provided externally, and hence answer signal timing from the master competes with the start signal from the slave on a transmission line to result in difficulty of assuring a start sequence from the slave to the master.

SUMMARY OF THE INVENTION

In view of the drawbacks of such prior art systems, it is an object of the present invention to provide an LSI for a ping-pong transmission capable of starting the slave LSI and the master LSI as described previously.

Another object of the present invention is to provide an LSI for ping-pong transmission of low power consumption capable of power-down control from the slave LSI.

Still another object of the present invention is to reduce power consumption of the master and slave LSIs by switching those LSIs to the power-down mode by making use of the starting method according to the present invention when the ping-pong transmission is not required.

Further another object of the present invention is to reduce undesired noise produced owing to electromagnetic radiation emanating from indoor digital communication instruments where LSIs are located by switching both said LSIs to the power-down mode by making use of the starting method according to the present invention when the ping-pong transmission is not required.

To achieve the above objects, a method of controlling the start of data transmission in a ping-pong transmission system effected between a master apparatus serving to perform the data transmission using a synchronizing signal entered from the outside and a slave apparatus operating in synchronism with a signal from said master apparatus, consists of the steps of: (a) permitting both the master and slave apparatuses to receive and detect a start instruction signal before starting the data transmission; (b) permitting the master apparatus to transmit an answer signal upon receiving said instruction signal and to thereby start the ping-pong transmission after a prescribed interval of time, and further permitting said master apparatus to start the ping-pong transmission after receiving the answer signal from the slave apparatus upon transmitting the start instruction signal; and (c) permitting the slave apparatus to transmit an answer signal upon receiving the start instruction signal and to thereby start the ping-pong transmission, and further permitting the slave apparatus to start the ping-pong transmission after receiving the answer signal upon transmitting the start instruction signal.

Moreover, a method is provided controlling the start of a first apparatus from a second apparatus in a ping-pong transmission system effected between these first and second apparatuses, the apparatuses performing data transmission by switching a synchronizing signal entered externally to a synchronizing signal extracted from a received signal or vice versa, and furthermore the apparatuses being switchable between a first mode in which no signal is transmitted so as to reduce power consumption and a second mode in which signal can be transmitted, said method comprising the steps of: (a) synchronizing the first apparatus with a synchronizing signal entered externally and switching the second apparatus to synchronize it with a received signal, the first and second apparatuses being operated in the first mode; (b) switching the first apparatus to the second mode to thereby transmit the start instruction signal to the second apparatus; (c) permitting said second apparatus to transmit back, upon receiving the start instruction signal, an answer signal synchronized with the start instruction signal to the first apparatus and to be thereby switched to the second mode; (d) switching the second apparatus to be synchronized with a synchronizing signal entered externally a prescribed time interval after the second apparatus transmits said answer signal; (e) switching the first apparatus to the first mode for a prescribed period of time for its synchronization with a received signal after the first apparatus receives the answer signal from said second apparatus; and (f) again switching the first apparatus to the signal mode to permit the ping-pong transmission to be effected from the second apparatus to the first apparatus thereafter.

Furthermore, an apparatus is provided for controlling the ping-pong transmission on a transmission line controlled and connected by a CPU, the apparatus comprising: (a) an equalizer means for equalizing a signal waveform on the transmission line; (b) a means connected to the equalizer means for extracting received data from the equalized signal waveform and for transmitting the extracted received data to the CPU; (c) a means connected to the equalizer means for detecting a frame from the equalized signal waveform and for thereby transmitting a first timing signal corresponding to that detected frame; (d) a controllable switching means for alternatively selecting the first timing signal and a second timing signal applied externally; (e) a means for generating a third timing signal on the basis of the first or second signal selected by the switching means; (f) a means for generating a signal to be transmitted onto the transmission line on the basis of the third timing signal; (g) a controllable gate means provided between the means for generating a signal to be transmitted and the transmission line for electrically connecting and disconnecting them together; (h) a means controllable from the CPU for controlling operation of the gate means; (j) a means for monitoring an output from the equalizer means to thereby control, upon detecting a prescribed signal, the means for controlling the gate means for a prescribed period of time for separating the means for generating a signal to be transmitted and the transmission line; (j) a means connected to the means for controlling operation of the gate means and the external CPU for operating, based upon an instruction from one of the means for controlling the gate means and the external CPU, the switching means for replacing the first timing signal with the second timing signal or vice versa.

The apparatus for controlling a ping-pong transmission according to the present invention includes, as described above, the control circuit in both of the master and slave LSIs for controlling them such that they are operatable under the slave mode before starting a data transmission (i.e. power-down mode). Accordingly, the master LSI can function as the slave side LSI, in the power-down mode, i.e., can transmit the AMI code to the partner in its state of waiting for reception in synchronism with the AMI code transmitted.

Moreover, the apparatus of the present invention was adapted, as described above, to provide a function of generating an answer signal to the start signal for control to both the LSIs, and provide to both the LSIs with a timer circuit for counting prescribed time.

Thus, the slave LSI can start the master LSI with these constituent components and with an external CPU. Namely, when the slave LSI contrives to start the master LSI, the external CPU first switches the slave side LSI to the power-up mode for thereby permitting the slave side LSI to transmit the start signal to the master LSI under a pseudo-slave mode and hence change to its state of waiting for reception. Then, the master LSI receives the start signal and transmits an answer signal thereto in synchronism with the start signal so received. In succession, the master side LSI is powered up by the built-in timer circuit after a prescribed period of time and is switched to the master mode. The slave LSI is then again switched to the power-down mode for a prescribed time interval by the built-in timer circuit upon receiving the answer signal transmitted back from the master LSI. Thereafter, the start signal is transmitted from the master LSI powered up to be switched in the master mode to the slave LSI in the power-down mode, whereby both the LSIs are started according to a know start sequence, for the ping-pong transmission.

Furthermore, with the arrangement, described above, the apparatus for controlling the ping-pong transmission on the transmission line, both the LSIs are opposed to each other via the transmission line to assure master-slave control by providing operation timings thereof specified to be different from each other. Moreover, a saving of power consumption is assured by switching the gate means at need.

The above and other objects, features and advantages of the present invention will become more apparent from the following description when taken in conjunction with the accompanying drawings in which a preferred embodiment of the present invention is shown by way of the illustrative example.

DESCRIPTION OF THE PREFERRED EMBODIMENT

In what follows, an embodiment of the method and apparatus for controlling the start of data communication will be described with reference to the accompanying drawings.

Figure 6:
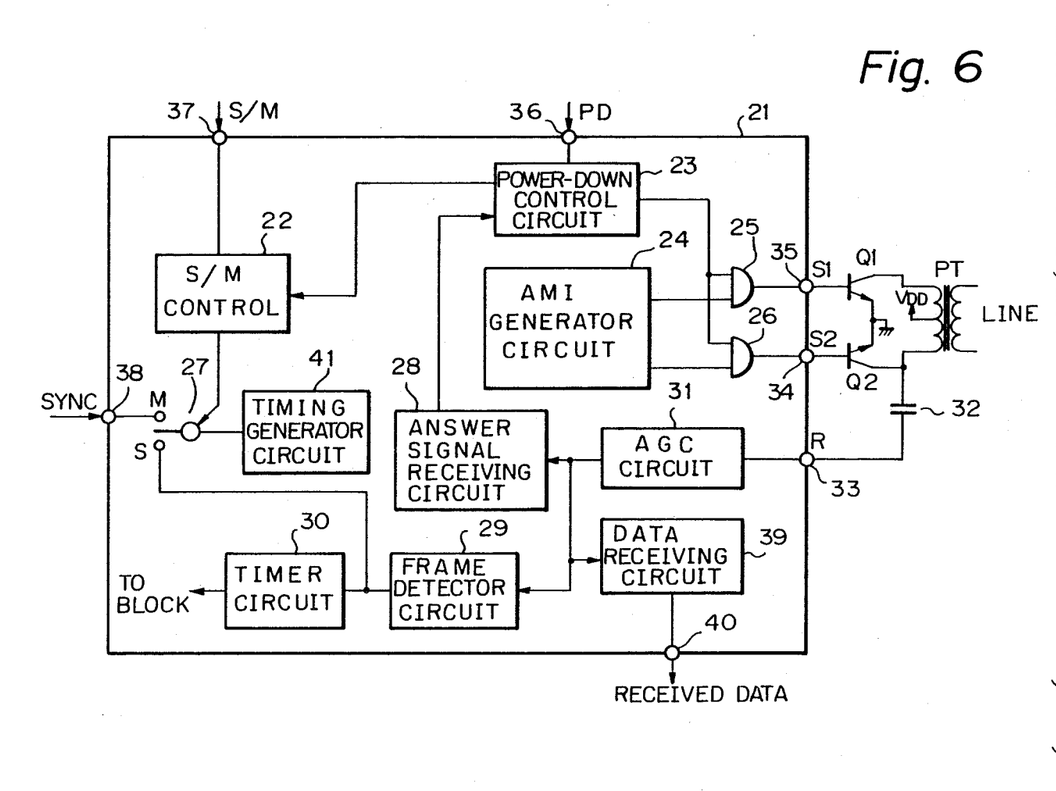
FIG. 6 is a block diagram illustrating the arrangement of an LSI for controlling a ping-pong transmission according to the present invention.

FIG. 6 is a block diagram illustrating an embodiment of the present invention, that is, an LSI for a ping-pong transmission (time compression multiplex) employed in the present invention. element 21 is an LSI body; element 22 is a circuit for switching and controlling a slave and a master; element 23 is a circuit for power-down control; element 24 is a generator circuit for generating the AMI code elements 25 and 26 are two input AND gates; element 27 is a switch controlled by the control circuit 22; element 28 is an answer signal receiving circuit; element 29 is a frame detector circuit; element 30 is a timer circuit for counting the number of frames; elements 31 is an AGC circuit for equalizing a line signal waveform; element 32 is a coupling capacitor for applying a received signal waveform to the AGC circuit element 33 is an input terminal (R) for inputting the received signal waveform to the LSI body 21; elements 34 and 35 are output terminals (S2 and S1) employed in FIG. 5; element 36 is a terminal (PD) for effecting power-down control externally; element 37 is a control terminal (S/M) for switching the LSIs to the slave or the master externally; element 38 is a terminal for applying operation synchronizing timing (SYNC) when the LSI is the master; element 39 is a data receiving circuit; element 40 is an output terminal for the received data; element 41 is an operation timing generating circuit provided in the LSI, and elements Q1, Q2, and PT are the same as those employed in FIG. 5.

First, the operation of each block will be described, and then a start sequence of each of the master and slave LSIs will be described. The present LSIs are assured to be incorporated in the apparatus, for example, for effecting the ping-pong transmission shown in FIG. 1, and to be monitored and controlled by an external CPU (not shown), for example by the CPUs 7 and 13 of FIG. 1.

First, a signal received from the transmission line is inputted into the AGC circuit 31 through the coupling capacitor 32 and input terminal (R) 33. A signal waveform equalized by the AGC circuit 31 is connected to the data receiving circuit 39 and outputted to the outside from the output terminal 40 as received data. In addition, the output from the AGC circuit 31 is also inputted into the answer signal receiving circuit 28.

The answer signal receiving circuit 28 is active when the present LSI is the SLSI, and is capable of actuating the power-down control circuit for a prescribed period of time.

Moreover, the output from the AGC circuit 31 is also inputted into the frame detector circuit 29. An output from the frame detector circuit 29 is connected to the timer circuit 30, which counts frames to judge whether or not the receiving state is stable, for thereby informing the respective blocks including the external CPU of the information. Furthermore, the output from the frame detector circuit is switched by the switch 27 from the external synchronizing signal at the synchronizing timing input terminal 38 to the timing generator circuit 41.

The above-described switch 27 is controlled by the S/M control circuit 22 and serves to permit the present LSI to select the slave or the master by itself. The S/M control circuit is instructed by an external CPU not shown) via the control terminal (S/M) 37. Here, as shown in the same figure, M designates the present LSI being the master while S designates the same being the slave.

The AMI generator circuit 24 generates the AMI code, and drives transistors Q1, and Q2 from the terminals S1 and S2 via the two-input AND gates 25 and 26 for transmitting an AMI signal waveform to the transmission line via the pulse transformer PT.

One input of the two input AND gates 25 and 26 are connected in common and connected to the output of the power-down control circuit 23, whereby the power-down control circuit 23 closes both gates when the power-down is needed to stop the transmission of the AMI waveform.

The method of controlling the start of the respective LSIs will be described below. Here, all the controls are effected by external CPUs (not shown), e.g., by the CPUs 7 and 13 shown in FIG. 1.

Figure 7:
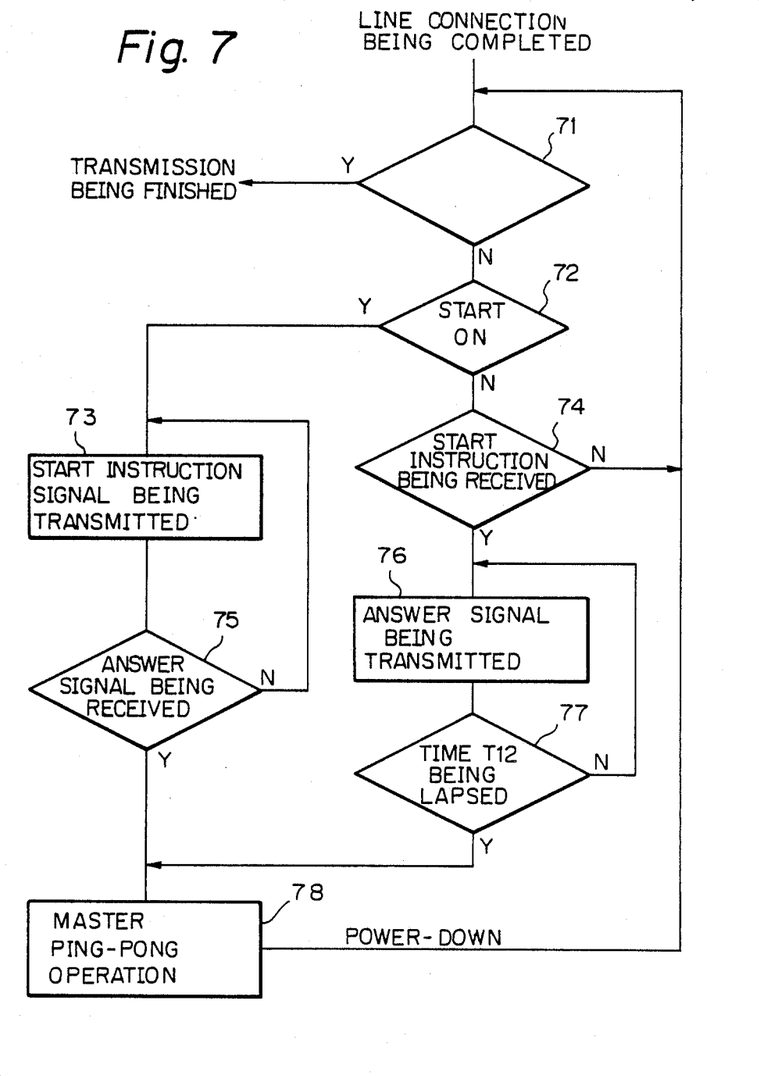
FIG. 7 is a flowchart of start control processing of the master LSI according to the present invention.

First, the MLSI will be described with reference to FIG. 7. The MLSI is adapted after connection thereof to the transmission line, to permit the M/S switch 27 to be shifted to the side M whereby it is switched to the power-down mode.

The MLSI can receive any signal even under the power-down mode as described previously. The external CPU monitors any incoming signal via the output terminal 40 and judges whether or not the transmission line is connected (step 1). When the MLSI needs to be started, the external CPU controls the power-down control circuit 23 via the terminal (PD) 36 to the power-up mode for thereby opening the gate circuits 25 and 26. The CPU forces the AMI generator circuit 24 to transmit a start instruction signal (step 73). The start instruction signal is in synchronism with a synchronizing signal from the synchronous input terminal 38, and is transmitted by the timing generator circuit 41 as a burst waveform having prescribed timing.

After transmitting the start instruction signal (step 73), the MLSI is placed in a state of waiting for an answer signal described later. Thereupon, the external CPU further monitors received data to judge whether or not it is the answer signal (step 75).

The external CPU, assuming the SLSI is switched to the power-up mode, forces, after a prescribed period of time, the MLSI to effect a conventional ping-pong transmission (step 78). The MLSI is again powered down after the concerning communication is finished.

The above description was for the case of the MLSI requesting the SLSI to be started, and so in succession operation of the MLSI to be started on the basis of a request by the SLSI will be described.

First, the same situation as described previously holds to the step 71: the MLSI is under the power-down mode and the external CPU monitors received signals. When there is no necessity for starting the SLSI from the MLSI, the external CPU controls the S/M control circuit 22 to shift the switch 27 to the side S for bringing the MLSI under the pseudo-slave mode (step 72).

Once the external CPU receives the start instruction signal from the SLSI (step 74), it switches the MLSI to the power-up mode and requests the AMI generator circuit 24 to transmit an answer signal in synchronism with the above start instruction signal (step 76).

Moreover, the MLSI at this time is still under the above pseudo-slave mode and has a function to transmit back a signal in synchronism with a received signal.

After transmitting an answer signal, the MLSI waits for a prescribed period of time T12 in conformity with a timer circuit (not shown) disposed in the S/M control circuit 22 (step 77), and the switch 27 is switched to the side M with the lapse of the above prescribed time T12 to permit the MLSI to become the ordinary master mode. The ordinary ping-pong operation is then started (step 78). The above situation (the MLSI becomes the pseudo-slave mode) is to securely transmit an answer signal in synchronism with reception timing by the SLSI.

Figure 8:
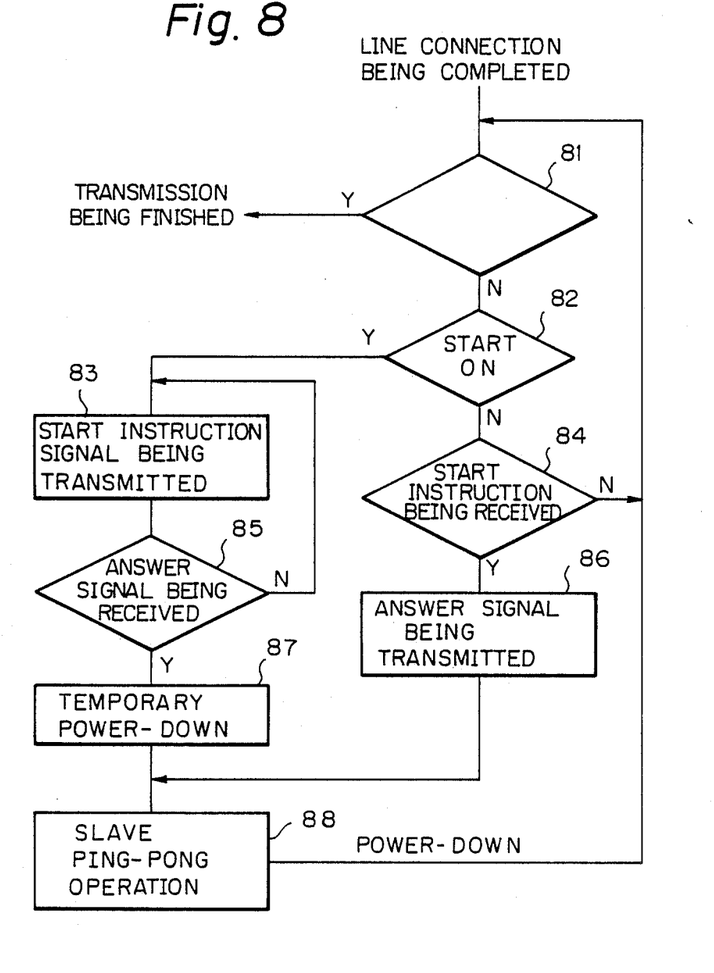
FIG. 8 is a flowchart of processing start control according to the method of the present invention.

The operation of the SLSI will be described with reference to FIG. 8.

The SLSI permits the switch 27 to be on the side S without fail after the connection to the transmission line is finished, and hence it is under the power-down mode (step 81). First, when the MLSI requests the SLSI to be started (step 82), the SLSI receives a start instruction signal therefrom (step 84) and permits the frame detector circuit 29 to detect a frame, and the timing generator circuit 41 to generate a timing signal to be transmitted to the MLSI now in the reception waiting state, and furthermore permits the AMI generator circuit 24 to transmit an answer signal (step 86).

Thereupon, the external CPU being monitoring the concerning data delivered from the receiving terminal 40 of the SLSI, upon detecting the answer signal being transmitted, controls the power-down control circuit via the control terminal (PD) 36 to release the SLSI from the power-down mode to the power-up mode.

Thereafter, the ordinary ping-pong transmission where the MLSI take the initiative in the synchronization is performed (step 88).

In what follows, the operation of the SLSI when the SLSI requests the SLSI to be started will be described.

First, after connection to the transmission line (step 81), the external CPU, provided the SLSI is in need of the MLSI being started, controls the power-down control circuit 23 via the control terminal (PD) 36 to bring the SLSI under the power-up mode. In this sequence, the MLSI is under the power-down mode and the frame detector circuit 29 of the SLSI has no input signals, therefore, the operation timing generating circuit 41 of the SLSI is capable of operating in a non-synchronous condition.

The SLSI transmits a start instruction signal based on such a non-synchronous condition (step 83). Thereupon, the MLSI is, as described before, under the pseudo-slave mode and transmits an answer signal in synchronism with the start instruction signal from the SLSI.

The answer signal receiving circuit 28 of the SLSI receives the above answer signal (step 85) to thereby control the power-down control circuit 23 for bringing the SLSI under the power-down mode for a prescribed period of time (step 87).

Thereafter, when the SLSI is released from the power-down mode to the power-up mode the MLSI starts ordinary ping-pong transmission as described previously and the SLSI follows after it (step 88).

Figure 9:
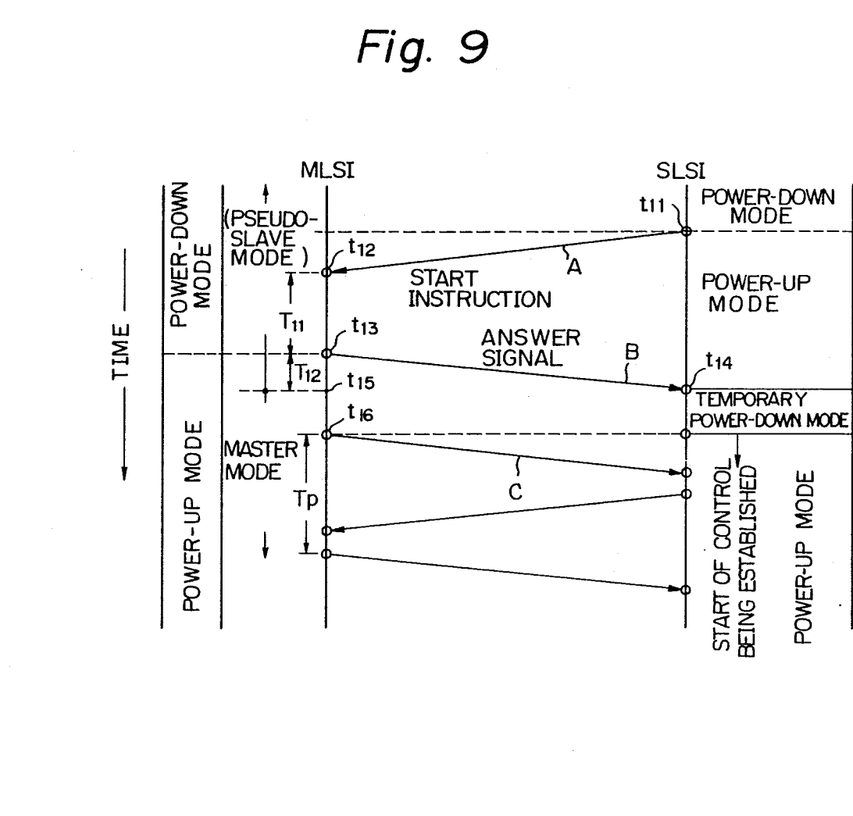
FIG. 9 is a view illustrating a sequence of start control upon starting the master LSI from the slave LSI in conformity with the starting method of the present invention.

Individual operations of the respective SLSI were described heretofore, and so illustrating here a timing relationship between those two SLSI, it is as shown in FIG. 9. This figure illustrates a timing relationship when the SLSI requests the MLSI to be started. In the same figure, t11 to t10 denotes time points of transmitting and receiving the concerning signal, t11 and t12 are time intervals, and Tp designates a ping-pong period (A to C are designations of the concerning signals).

As illustrated in FIG. 9, the SLSI is under the power-up mode to thereby transmit a start instruction signal A t11, and once the MLSI being under the pseudo-slave mode receives this start instruction signal (t12), it is brought to the power-up mode (but, pseudo-slave mode) after a prescribed period of time (T11) with the aid of the internal timer circuit, for transmitting an answer signal (B) (t13).

Thereafter, the MLSI gets to have a normal master function (t15) after a prescribed interval of time (T12) with the aid of the internal timer circuit (t15).

While, the SLSI receiving the answer signal B is permitted to be switched to the power-down mode for a prescribed interval of time (t16–t14) by the answer signal receiving circuit 28 of FIG. 6 for keeping its reception waiting state. Since the MLSI is transmitting the AMI waveform also at this time, the SLSI can transmit the concerning signal to the MLSI in its reception waiting state.

After the SLSI is switched to the slave mode to be released temporarily from the power-down mode (t16), the MLSI starts the ping-pong transmission having an ordinary ping-pong period Tp.

According to the present invention, as described above, the master can be started from the slave side or vice versa, whereby power-down and power-up controls are made possible on the slave side. The slave is thereupon a digital telephone set and the like, which is usually installed in a general family or in offices, etc. Thereupon, when a ping-pong transmission waveform is transmitted through a telephone circuit, noise may be produced in those offices owing to electromagnetic radiation. However, according to the present invention, when no ping-pong transmission is needed, the master or the slave can be powered down to reduce such unnecessary noise due to electromagnetic radiation together with assurance of reduced power consumption in the slave side described previously.

Although a certain preferred embodiment has been shown and described, it should be understood that many changes and modifications may be made therein without departing from the scope of the appended claims.

What is claimed is:

1. A method for controlling an initialization of ping-pong-type data transmission in a ping-pong transmission system effected between a master apparatus and a slave apparatus, each of the master apparatus and slave apparatus respectively connectable to first and second central processing units, the master apparatus further connectable to a synchronizing clock signal source for synchronizing the data transmission, said method comprising the steps of:

(a) permitting both of the master apparatus and the slave apparatus to generate a start instruction signal responsive to instructions from the first and second central processing units, respectively;

(b) permitting both of the master apparatus and the slave apparatus to receive and detect a start instruction signal generated by the slave apparatus and the master apparatus, respectively;

(c) generating an answer signal from the master apparatus to the slave apparatus when the master apparatus detects a start instruction signal generated by the slave apparatus, the answer signal generated by the master apparatus being synchronized with the start instruction signal generated by the slave apparatus, and then permitting the slave apparatus to begin the ping-pong-type data transmission upon receiving the answer signal generated by the master apparatus;

(d) generating an answer signal from the slave apparatus to the master apparatus when the slave apparatus detects a start instruction signal generated by the master apparatus, the answer signal generated by the slave apparatus being synchronized with the start instruction signal generated by the master apparatus, and then permitting the master apparatus to begin the ping-pong-type data transmission upon receiving the answer signal generated by the slave apparatus.

2. A method for controlling an initialization of ping-pong-type data transmission in a ping-pong transmission system effected between a first apparatus and a second apparatus, each of said first apparatus and said second apparatus being switchable between a first mode in which a signal cannot be transmitted to reduce power consumption and a second mode in which a signal can be transmitted, said method comprising the steps of:

(a) placing the first apparatus and the second apparatus in the first mode;

(b) synchronizing the first apparatus with a first synchronizing signal applied thereto by a first external synchronizing signal source;

(c) placing the second apparatus in a condition for synchronizing with a signal received from the first apparatus;

(d) switching the first apparatus to the second mode;

(e) transmitting from the first apparatus to the second apparatus a start instruction signal;

(f) switching the second apparatus to the second mode;

(g) transmitting from the second apparatus to the first apparatus an answer signal, the answer signal being synchronized with the start instruction signal transmitted from the first apparatus to the second apparatus;

(h) placing the second apparatus in a condition for synchronizing with a second synchronizing signal applied thereto by a second external synchronizing source, and synchronizing the second apparatus with the second synchronizing signal;

(i) switching the first apparatus to the first mode;

(j) synchronizing the first apparatus with the answer signal transmitted by the second apparatus; and (k) switching the first apparatus to the second mode to begin the ping-pong-type transmission.

3. An apparatus for controlling a ping-pong transmission on a transmission line controlled by a CPU connected thereto, said apparatus comprising:

an equalizer means for equalizing a signal waveform of the transmission line;

(b) a means connected to said equalizer means for extracting received data from said equalized signal waveform and for transmitting the extracted received data to said CPU;

(c) a means connected to said equalizer means for detecting frames from said equalized signal waveform so as to thereby transmit a first timing signal corresponding to said detected frame;

(d) a controllable switching means for alternatively selecting said first timing signal and a second timing signal applied externally;

(e) a means for generating a third timing signal in conformity with said first or second signal selected by said switching means;

(f) a means for generating a signal to be transmitted onto the transmission line in conformity with said third timing signal;

(g) a controllable gate means provided between said means for generating a signal to be transmitted and the transmission line for electrically connecting and disconnecting them together;

(h) a means controllable from said CPU for controlling said gate means;

(i) a means for monitoring an output from said equalizer means to thereby control, upon detecting a prescribed signal, said means for controlling said gate means for a prescribed period of time, and for separating said means for generating a signal to be transmitted and the transmission line from each other;

(j) a means for selectively connecting said switching means to said means for controlling operation of said gate means and to said CPU for operating, based upon an instruction from one of said means for controlling said gate means and said CPU, said switching means to switch said first timing signal with said second timing signal.

* * * * *